(12) United States Patent
Prater

(10) Patent No.: US 6,480,363 B1
(45) Date of Patent: Nov. 12, 2002

(54) HARD DISK DRIVE ACTUATOR ASSEMBLY WITH DAMPED TOLERANCE RING FOR ENHANCING DRIVE PERFORMANCE DURING STRUCTURAL RESONANCE MODES

(75) Inventor: Walter L. Prater, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/575,555

(22) Filed: May 22, 2000

(51) Int. Cl.$^7$ .......................... G11B 5/55; F16C 27/00; F16C 3/00
(52) U.S. Cl. ..................... 360/265.7; 384/536; 464/180
(58) Field of Search ........................... 360/265.7, 265.2; 384/220, 536, 582, 611; 310/51, 67 R; 464/180–183; 403/171–172

(56) References Cited

U.S. PATENT DOCUMENTS

| | | |
|---|---|---|
| 3,142,887 A | 8/1964 | Hulck et al. |
| 3,633,398 A | 1/1972 | Koch |
| 3,838,928 A | 10/1974 | Blaurock et al. |
| 4,286,894 A | 9/1981 | Rongley |
| 4,790,683 A | 12/1988 | Cramer, Jr. et al. |
| 4,981,390 A | 1/1991 | Cramer, Jr. et al. |
| 5,125,755 A | 6/1992 | Adler et al. |
| 5,315,465 A | 5/1994 | Blanks |
| 5,491,598 A | 2/1996 | Stricklin et al. |
| 5,666,242 A | 9/1997 | Edwards et al. |
| 5,675,456 A | 10/1997 | Myers |
| 5,727,882 A | 3/1998 | Butler et al. |
| 5,826,987 A | 10/1998 | Beaman |
| 5,914,837 A | 6/1999 | Edwards et al. |
| 5,930,071 A | 7/1999 | Back |

OTHER PUBLICATIONS

"Resilient Ring for Isolating a Motor with Respect to a Support Frame"–W. E. Beuch, IBM Technical Disclosure Bulletin, vol. 26, No. 3B, Aug. 1983.
"3M Storage Systems Spotlight"–Published by 3M Storage Systems Business, vol. 1, Issue 4, Sep., 1999.

Primary Examiner—George J. Letscher
(74) Attorney, Agent, or Firm—Robert B. Martin; Bracewell & Patterson, L.L.P.

(57) ABSTRACT

A damped tolerance ring assembly has an outer tolerance ring, an inner tolerance ring, and an elastomeric layer bonded therebetween. The tolerance rings are metal, spring-like split rings. Each tolerance ring has corrugations for additional strength. The elastomeric layer contours to the shape of both the inner and outer rings and their corrugations. The damped tolerance ring assembly is press fit between a cylindrical pivot assembly and a cylindrical hole in the actuator body of a disk drive. The friction at the interfaces of the tolerance rings due to compressive forces hold the pivot securely in the actuator body such that they all rotate together relative to a pivot shaft. The tolerance rings are formed from steel and provide a stiff outer shell for the ring assembly to resist axial rocking of the actuator body relative to the pivot, especially during structural resonance modes. The thin layer of elastomer provides the damping and isolation to absorb vibration energy of the bearing reaction force. The vibration energy is not transferred to the read/write heads of the drive. Thus, track misregistration is reduced and performance is improved.

18 Claims, 2 Drawing Sheets

HARD DISK DRIVE ACTUATOR ASSEMBLY WITH DAMPED TOLERANCE RING FOR ENHANCING DRIVE PERFORMANCE DURING STRUCTURAL RESONANCE MODES

TECHNICAL FIELD

The present invention relates in general to an improved hard disk drive, and in particular to an improved pivot assembly for a hard disk drive actuator. Still more particularly, the present invention relates to a damped tolerance ring for the pivot assembly of a hard disk drive actuator to improve performance of the drive.

DESCRIPTION OF THE RELATED ART

Generally, a digital data storage system consists of one or more storage devices that store data on storage media such as magnetic or optical data storage disks. In magnetic disk storage systems, a storage device is called a hard disk drive (HDD), which includes one or more hard disks and an HDD controller to manage local operations concerning the disks. Hard disks are rigid platters, typically made of aluminum alloy or a mixture of glass and ceramic, covered with a magnetic coating. Typically, several platters are stacked vertically on a common spindle that is turned by a disk drive motor at several thousand revolutions per minute (rpm).

Within most drives, one read/write head is associated with each side of each platter and flies just above or below the platter's surface. Each read/write head is connected to a semi-rigid arm apparatus which supports the entire head flying unit. More than one of such arms may be utilized together to form a single armature unit. Each read/write head scans the hard disk platter surface during a "read" or "write" operation. The head/arm assembly is moved utilizing an actuator having an actuator body mounted on a pivot assembly. The actuator is often a voice coil motor (VCM) having a stator that is mounted to a base plate or casting. The base casting is also the foundation for a rotatable spindle that supports the disks. The base casting is mounted to a frame via a compliant suspension. When current is fed to the motor, the VCM develops force or torque which is substantially proportional to the applied current. As the read/write head nears the desired track, a reverse polarity signal is applied to the actuator, causing the signal to act as a brake, and ideally causing the read/write head to stop directly over the desired track.

Modern HDD throughput and storage capacity have been substantially increased by improvement in actuator design which has resulted in increased precision and speed in head placement. The more precisely the actuator can place the read/write head, the greater the track density of the drive. However, rotary actuators have structural resonance modes that can affect disk drive performance. Some structural modes apply a reaction force against the pivot bearing, thereby tilting or rocking the actuator body on the pivot. Angular displacements of less than a milliradian of actuator rocking will cause the heads of the drive to go off-track. In the prior art, a number of solutions have been attempted to compensate for structural modes. For example, in U.S. Pat. Nos. 5,914,837 and 5,666,242, a set of O-rings provide some external vibration isolation and damping between the actuator body and the pivot. However, the small dimensions of the O-rings provide insufficient compressive force to give the system adequate stiffness to completely overcome the mode-induced forces. This O-ring design is incapable of providing sufficient stiffness for high track density disk drives. Although a much larger O-ring would provide more stiffness, it would force either the pivot groove or the bore to be greatly enlarged, thereby making insertion of the pivot into the actuator body much more difficult. In addition, geometric constraints on the parts limit the degree to which they may be scaled to larger dimensions.

Alternatively, a harder material could be used in the O-ring to provide greater stiffness, but this option would be less compressible, thereby also making insertion difficult. Moreover, compressed O-rings undergo stress relaxation when exposed to the elevated temperatures of disk drives over time, thereby diminishing any compressive force they may supply (i.e., the O-ring would flatten out into the groove and surrounding gap). In summary, this is not a good application for an O-ring since it must provide both damping/isolation and act as a spring.

When the O-rings are incorporated internally within the pivot assembly, the pivot assembly must be segregated into two portions that are screwed together. Problems with this design include forcing changes to the internal geometry of the pivot with thinner, less stiff ball bearings. In addition, the O-rings themselves must have a smaller diameter and, consequently, less stiffness to overcome the structural mode forces.

In U.S. Pat. No. 5,727,882, the pivot is bonded or glued with circular adhesive beads within the actuator body. This design provides no net compressive force between the pivot and the actuator body. Thus, the glued assembly is not sufficiently stiff to prevent an actuator from rocking against the pivot. Moreover, this design is not reworkable since the body is permanently joined to the pivot. Thus, an improved interface for disk drive pivots and actuators is needed.

SUMMARY OF THE INVENTION

All objects, features, and advantages of the present invention will become apparent in the following detailed written description.

A damped tolerance ring assembly has an outer tolerance ring, an inner tolerance ring, and an elastomeric layer bonded therebetween. In the illustrative embodiment, the tolerance rings are metal, spring-like split rings. Each tolerance ring has corrugations for additional strength. The elastomeric layer contours to the shape of both the inner and outer rings and their corrugations. The damped tolerance ring assembly is press fit between a cylindrical pivot assembly and a cylindrical hole in the actuator body of a disk drive. The friction at the interfaces of the tolerance rings due to compressive forces hold the pivot securely in the actuator body such that they all rotate together relative to a pivot shaft.

The tolerance rings are formed from steel and provide a stiff outer shell for the ring assembly to resist axial rocking of the actuator body relative to the pivot, especially during structural resonance modes. The thin layer of elastomer provides the damping and isolation to absorb vibration energy of the bearing reaction force. The vibration energy is not transferred to the read/write heads of the drive. Thus, track misregistration is reduced and performance is improved.

Accordingly, it is an object of the present invention to provide an improved hard disk drive.

It is an additional object of the present invention to provide an improved pivot assembly for a hard disk drive actuator.

Still another object of the present invention is to provide a damped tolerance ring for the pivot assembly of a hard disk drive actuator to improve performance of the drive.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

With reference now to the figures and in particular with reference to FIG. 1, there is While the invention has been particularly shown and described with reference to a preferred embodiment, it will be understood by those skilled in the art that various changes in form and detail may be made therein without departing from the spirit and scope of the invention.

Figure 1:
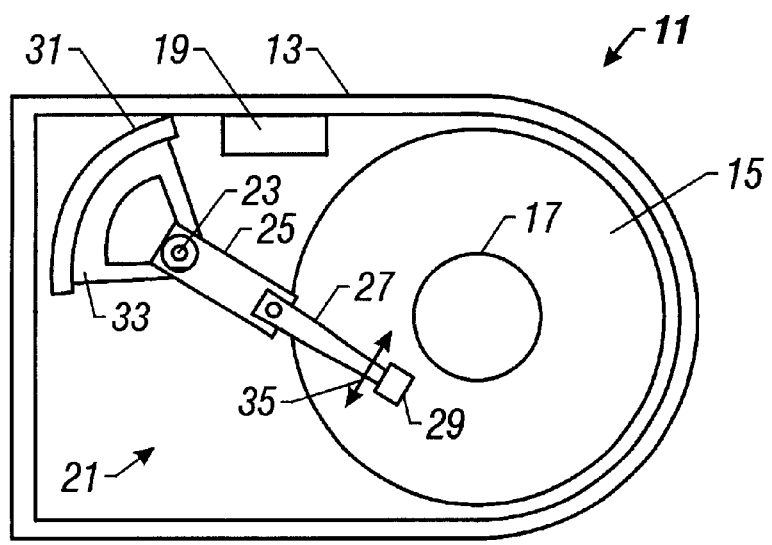
FIG. 1 depicts an illustrative embodiment of a data processing system with which the method and system of the present invention may advantageously be utilized;is a schematic diagram of an illustrative hard disk drive used in conjunction with the invention.

Referring to FIG. 1, a schematic drawing of an information storage system comprising a magnetic hard disk drive 11 is shown. Drive 11 has a base 13 containing a plurality of stacked, parallel magnetic disks 15 (one shown) which are closely spaced apart. Disks 15 are rotated by a spindle motor (not shown) located therebelow about a central drive hub 17. An actuator 21 is pivotally mounted to base 13 about a pivot assembly 23. A controller 19 is mounted to base 13 for selectively moving actuator 21 as will be described below.

Actuator 21 has a mounting support 25, a pair of parallel, cantilevered load beams or suspensions 27 extending from mounting support 25, and a head gimbal assembly 29 having at least one magnetic read/write head secured to each suspension 27 for magnetically reading data from or magnetically writing data to disks 15. Suspensions 27 have a spring-like quality which biases or maintains them in parallel relationship relative to one another. A motor assembly 31 having a conventional voice coil motor 33 is also mounted to pivot assembly 23 opposite head gimbal assemblies 29. Movement of actuator 21 (indicated by arrows) moves head gimbal assemblies 29 radially across tracks on the disks 15 until the heads on assemblies 29 settle on the target tracks.

Figure 2:
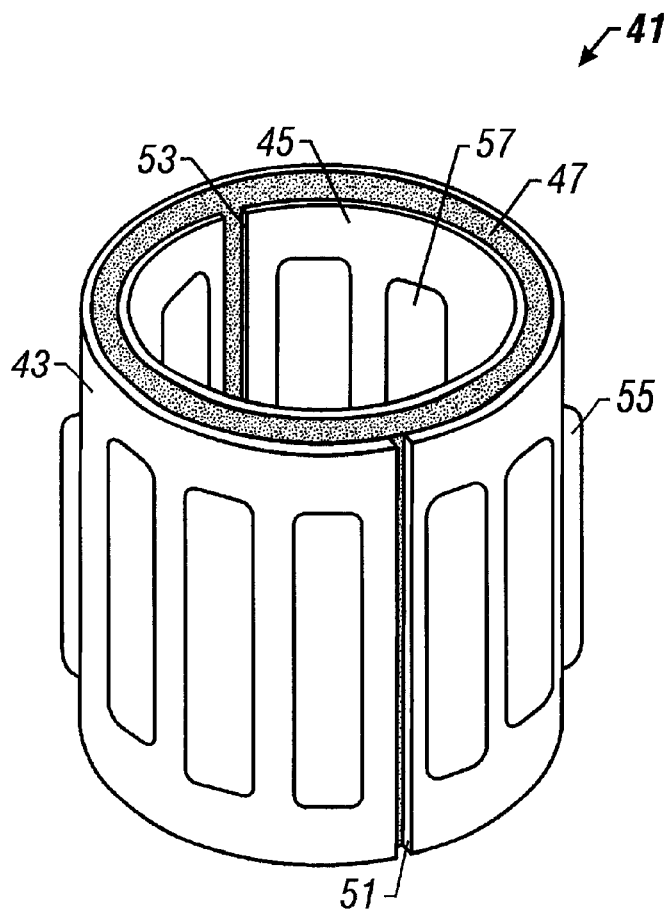
FIG. 2 is an isometric view of a tolerance ring constructed in accordance with one embodiment of the invention.
Figure 3:
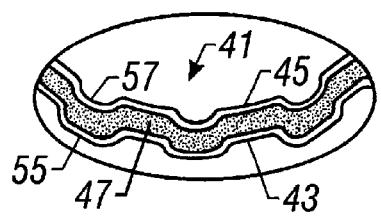
FIG. 3 is an enlarged top view of a portion of the tolerance ring of FIG. 2.

Referring now to FIGS. 2 and 3, a damped tolerance ring assembly 41 for pivot assembly 23 is shown. Assembly 41 comprises an outer tolerance ring 43, an inner tolerance ring 45, and a somewhat compliant damping/isolation material 47 located and bonded therebetween. In the preferred embodiment, tolerance rings 43, 45 are spring-like metal split rings having openings 51, 53, respectively. In FIGS. 2 and 3, tolerance rings 43, 45 are oriented such that openings 51, 53 are located 180 degrees apart from each other. Each ring 43, 45 is also provided with corrugations 55, 57, respectively, for additional strength. As shown in FIG. 3, corrugations 55, 57 are equal in number, angularly align with one another, and protrude radially outward from the axis of ring assembly 41. Corrugations 55, 57 also have an axial dimension that is less than an overall axial dimension of ring. assembly 41. The damping/isolation material 47 is ideally a continuous, generally tubular piece of elastomeric substance such as rubber. Damping/isolation material 47 contours to the shape of both inner and outer rings 45, 47 and their respective corrugations 55, 57.

Figure 4:
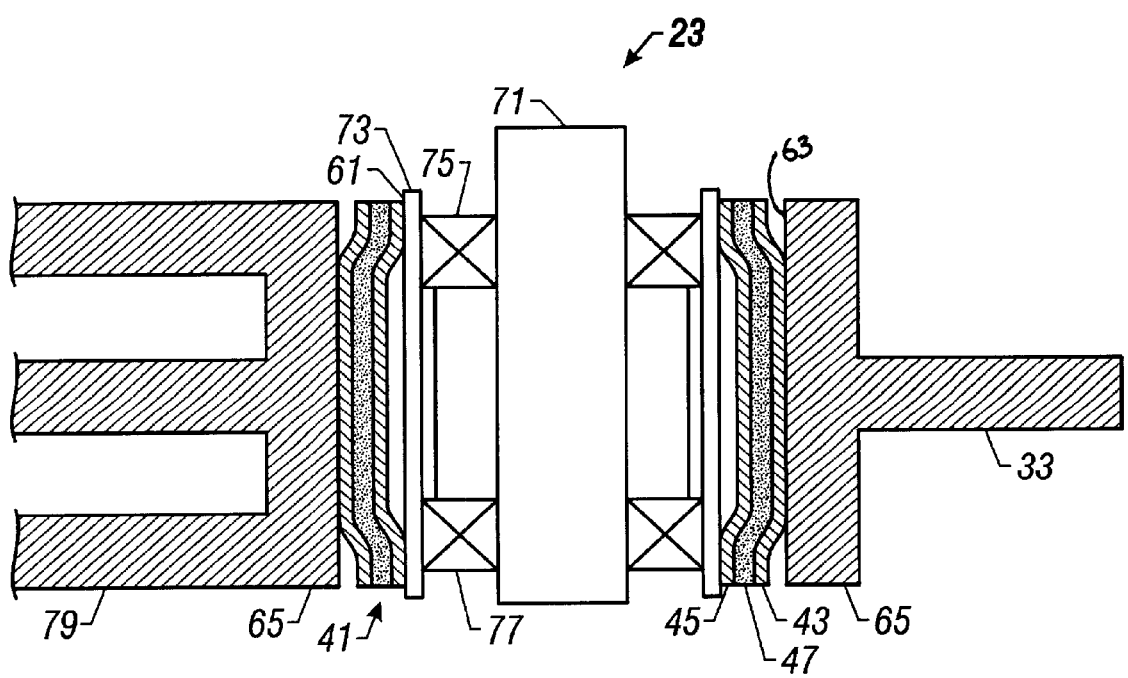
FIG. 4 is a sectional side view of the tolerance ring of FIG. 2 installed in a pivot and actuator body assembly.

In operation (FIG. 4), damped tolerance ring assembly 41 is closely received and, preferably, press fit between the outer diameter 61 of a cylindrical pivot assembly 23, and the inner diameter of a cylindrical hole 63 in an actuator body 65. The friction at the interfaces of tolerance rings 43, 45 due to compressive forces hold pivot 23 securely in actuator body 23. In this configuration, ring assembly 41, pivot 23, and hole 63 in actuator body 65 are coaxial. Pivot assembly 23 comprises a pivot shaft 71 that is rotatably mounted inside a pivot sleeve 73 on two sets of ball bearings 75, 77. Actuator body 65 has voice coil motor 33 on one end and a comb structure 79 on an opposite end for supporting mounting supports 25 (FIG. 1). A very tight fit is achieved between pivot sleeve 61, ring assembly 41, and actuator body 65 such that there is no rotational slippage therebetween. Thus, pivot sleeve 61, ring assembly 41, and actuator body 65 all rotate together relative to pivot shaft 71.

Tolerance rings 43, 45 are preferably formed from steel and provide a stiff outer shell for ring assembly 41, thereby imparting both the compressive retaining force and stiffness to resist axial rocking of actuator body 65 relative to pivot 23, particularly during structural resonance modes. The thin layer 47 of elastomeric polymer provides the damping and/or isolation and extends along the entire axial length of pivot 23 from top to bottom. Layer 47absorbs vibration energy of the bearing reaction force. The vibration energy is not transferred to the read/write heads. Thus, track misregistration is reduced and performance is improved. The radial compression of layer 47 is very limited since its inner surface is bonded to the exterior of pivot 23 and its outer surface is bonded to the interior of actuator body 65. Therefore, layer 47 cannot stress relax since it is incapable of axial movement.

The damped/isolation tolerance ring of the present invention has many advantages by using a layer of elastomeric material between two concentric tolerance split rings. Isolation of the pivot is achieved without compromising the internal design of the pivot to accommodate a seal such as O-rings. The elastomeric layer of the tolerance ring compresses and is not ruined by plastic deformation. The ring provides a radial gripping force around the pivot's circumference, thus permitting reuse. This design is cost effective since the tolerance ring may be reused if the pivot is defective. Prior art tolerance rings are usually discarded after a single use which is inherently more expensive (additional shaft and two O-rings).

Furthermore, the compressive forces supplied by the present invention are more uniform around the circumference of the pivot because the distortion of the elastomeric layer evenly distributes the forces originating at the elastic deformation of the tolerance ring's corrugations. This design reduces the negative effect of torque ripple that prior art tolerance rings have on the pivot bearings. Since pivot bearings have minimal material, it has long been known that tolerance ring corrugations produce significant torque ripple to the detriment of disk drive track misregistration. No form factor change to the pivot is required to tune the damping/ isolation or stiffness of the tolerance ring. The larger cylindrical volume of the present invention allows designers more latitude in achieving the desired isolation and stiffness. For example, this can be accomplished by applying the elastomer in two parallel bands. In contrast, to change the isolation or stiffness using an O-ring design, a different-sized O-ring would be required which, in turn, would require dimensional changes to be made to the pivot shaft and sleeve.

In addition, by absorbing energy of the primary mode (a.k.a., the "butterfly" mode) having a strong bearing force, less energy is spread to the higher frequencies. This is beneficial to the phase stability of the servo notch for the next highest arm mode (a.k.a., the "S-mode"). The stiffness of the pivot and actuator joint can be tailored by changing the modulus of the damping material and the geometry. A small stiffness reduction of the pivot and actuator joint will reduce the frequency of the butterfly mode without appreciably altering the higher frequencies of the S, M, and end arm modes. The gain from the high frequency side of one of the broad "tails" of the butterfly mode can overlap with the frequency of the adjacent S-mode. In effect, the close proximity of the broad band butterfly mode boosts the gain of the S-mode, thus causing degradation in file performance. The damped tolerance ring between the pivot bearing and the actuator is beneficial because it reduces the frequency of the butterfly mode, thereby minimizing its influence on the S-mode. In the case of dual actuators, the vibrational crosstalk from one actuator to the other can be suppressed by the use of damped tolerance rings between the common pivot (which is conducting the vibrations) and the two actuators. The present design would prevent the vibrations generated by a seeking actuator from affecting the other actuators track-following or settle performance.

While the invention has been shown or described in only some of its forms, it should be apparent to those skilled in the art that it is not so limited, but is susceptible to various changes without departing from the scope of the invention. For example, isolating the s actuator's vibration from the top cover and the base casting will help reduce seek acoustics.

What is claimed is:

1. A damped tolerance ring for an actuator assembly in a disk drive, comprising:
    an outer tolerance ring having an inner surface, and an outer surface adapted to engage an inner surface of an actuator body;
    an inner tolerance ring having an outer surface, and an inner surface adapted to engage a sleeve on a pivot assembly; and a compliant material located between the inner surface of the outer tolerance ring and the outer surface of the inner tolerance ring, the compliant material being tubular in shape and contoured to conform to both the inner surface of the outer tolerance ring, and to the outer surface of the inner tolerance ring, wherein the tolerance rings provide a stiff outer shell and the compliant material provides damping for the damped tolerance ring, thereby imparting compressive retaining force and stiffness to resist axial rocking of the actuator body relative to the pivot assembly.

2. The damped tolerance ring of claim 1 wherein each of the inner and outer tolerance rings are steel split rings.

3. The damped tolerance ring of claim 1 wherein the compliant material is an elastomeric polymer.

4. The damped tolerance ring of claim 1 wherein the damped tolerance ring has an axial dimension that is adapted to be equal to an axial dimension of the sleeve.

5. The damped tolerance ring of claim 1 wherein the damped tolerance ring is adapted to be press fit between the pivot assembly and the actuator body.

6. The damped tolerance ring of claim 1 wherein the compliant material is bonded to both the inner and outer tolerance rings.

7. The damped tolerance ring of claim 1 wherein each of the inner and outer tolerance rigs have corrugations, and wherein the compliant material contours to conform to both the inner surface of the outer tolerance ring, and to the outer surface of the inner tolerance ring, including their corrugations.

8. A damped tolerance ring for an actuator assembly in a disk drive, comprising:
    an outer tolerance ring having an inner surface, and an outer surface adapted to engage an inner surface of an actuator body;
    an inner tolerance ring having an outer surface, and an inner surface adapted to engage a sleeve on a pivot assembly; and
    a compliant material located between the inner surface of the outer tolerance ring and the outer surface of the inner tolerance ring, wherein the tolerance rings provide a stiff outer shell and the compliant material provides damping for the damped tolerance ring, thereby imparting compressive retaining force and stiffness to resist axial rocking of the actuator body relative to the pivot assembly; and wherein
    each of the inner and outer tolerance rings have corrugations that are equal in number, angularly align with one another, and protrude radially outward from an axis of the damped tolerance ring.

9. An actuator assembly for a disk drive, comprising:
    a pivot assembly having a sleeve with an axis, an outer surface, and two axial ends, and a shaft coaxially mounted within the sleeve;
    an actuator body having a hole; and
    a damped tolerance ring assembly coaxially mounted between the outer surface of the sleeve and the hole in the actuator body, the damped tolerance ring assembly having an outer ring, an inner ring, and a compliant material located therebetween, wherein the rings have corrugations and provide a stiff outer shell and the compliant material provides damping for the ring assembly, thereby imparting compressive retaining force and stiffness to resist axial rocking of the actuator body relative to the pivot assembly, wherein
    the compliant material is tubular in shape, has the same axial dimension as the inner and outer rings, and is contoured to conform to both an inner surface of the outer ring, and to an outer surface of the inner ring, including their corrugations.

10. The actuator assembly of claim 9 wherein each of the inner and outer rings of the damped tolerance ring are steel split rings.

11. The actuator assembly of claim 9 wherein the compliant material is an elastomeric polymer.

12. The actuator assembly of claim 9 wherein the damped tolerance ring has an axial dimension that extends substantially between the axial ends of the sleeve.

13. The actuator assembly of claim 9 wherein the damped tolerance ring is press fit between the pivot assembly and the actuator body.

14. The actuator assembly of claim 9 wherein the compliant material is bonded to both the inner and outer rings of the damped tolerance ring.

15. An actuator assembly for a disk drive, comprising:
   a pivot assembly having a sleeve with an axis, an outer surface, and two axial ends, and a shaft coaxially mounted within the sleeve;
   an actuator body having a hole; and
   a damped tolerance ring assembly coaxially mounted between the outer surface of the sleeve and the hole in the actuator body, the damped tolerance ring having an outer ring, an inner ring, and a compliant material located therebetween, wherein the tolerance rings provide a stiff outer shell and the compliant material provides damping for the ring assembly, thereby imparting compressive retaining force and stiffness to resist axial rocking of the actuator body relative to the pivot assembly; and wherein
      each of the inner and outer rings of the damped tolerance ring have corrugations that are equal in number, angularly align with one another, and protrude radially outward from an axis of the damped tolerance ring.

16. A damped tolerance ring for an actuator assembly in a disk drive, comprising:
   a metal, outer tolerance split ring having an inner surface, and an outer surface adapted to engage an inner surface of an actuator body;
   a metal, inner tolerance split ring having an outer surface, and an inner surface adapted to engage a sleeve on a pivot assembly;
   a tubular elastomeric polymer located between and bonded to both the inner surface of the outer tolerance split ring and the outer surface of the inner tolerance split ring, wherein the tolerance split rings provide a stiff outer shell and the elastomeric, polymer provides damping for the damped tolerance ring, thereby imparting compressive retaining force and stiffness to resist axial rocking of the actuator body relative to the pivot assembly; wherein
      each of the inner and outer tolerance split rings have corrugations that are equal in number, angularly align with one another, and protrude radially outward from an axis of the damped tolerance ring.

17. The damped tolerance ring of claim 16 wherein the damped tolerance ring has an axial dimension that is adapted to be equal to an axial dimension of the sleeve.

18. The damped tolerance ring of claim 16 wherein the damped tolerance ring is adapted to be press fit between the pivot assembly and the actuator body.

* * * * *